US012589772B2

(12) United States Patent
Michelfeit et al.

(10) Patent No.: US 12,589,772 B2
(45) Date of Patent: Mar. 31, 2026

(54) COMBINED ACCELERATION SENSOR FOR HIGH-G AND LOW-G CRASH DETECTION FOR AN AUTONOMOUS VEHICLE

(71) Applicant: Robert Bosch GmbH, Stuttgart (DE)

(72) Inventors: Ulrich Michelfeit, Freiberg (DE); Rameez Ahmad, Canton, MI (US)

(73) Assignee: Robert Bosch GmbH, Stuttgart (DE)

( * ) Notice: Subject to any disclaimer, the term of this patent is extended or adjusted under 35 U.S.C. 154(b) by 735 days.

(21) Appl. No.: 17/475,028

(22) Filed: Sep. 14, 2021

(65) Prior Publication Data

US 2022/0266863 A1     Aug. 25, 2022

Related U.S. Application Data

(60) Provisional application No. 63/151,372, filed on Feb. 19, 2021.

(51) Int. Cl.
  B60R 21/01          (2006.01)
  B60R 21/23          (2006.01)
  (Continued)

(52) U.S. Cl.
  CPC ......... B60W 60/0016 (2020.02); B60R 21/23 (2013.01); B60W 30/08 (2013.01); B60W 2030/082 (2013.01)

(58) Field of Classification Search
  CPC .... B60W 60/0016; B60W 30/08; B60R 21/23
  See application file for complete search history.

(56) References Cited

U.S. PATENT DOCUMENTS

| | | | | |
|---|---|---|---|---|
| 11,922,734 B1 * | 3/2024 | Kellett | ................... | G07C 5/085 |
| 2008/0196499 A1 * | 8/2008 | Li | .......................... | G01P 15/125 |
| | | | | 29/595 |

(Continued)

FOREIGN PATENT DOCUMENTS

| | | |
|---|---|---|
| CN | 203455910 U | 2/2014 |
| CN | 104249706 A | 12/2014 |

(Continued)

OTHER PUBLICATIONS

German Patent Office Action for Application No. 102022201662.9 dated Mar. 24, 2023 (10 pages including statement of relevance).

*Primary Examiner* — Scott A Browne
*Assistant Examiner* — Rami Nabih Bedewi
(74) *Attorney, Agent, or Firm* — Michael Best & Friedrich LLP

(57)          ABSTRACT

An acceleration sensor for a vehicle includes a micro-electro-mechanical (MEMS) high-G sensing element and low-G sensing element provided in a single MEMS housing in one embodiment. In another embodiment, the high-G sensor and the low-G sensor are integrated as a single MEMS low/high-G sensing element and in another embodiment, the high-G and low-G sensing elements are provided in separate MEMS housings disposed in the same acceleration sensor housing. An application specific integrated circuit (ASIC) processes signals from the high-G/low-G sensing element(s). A collision determination system for an autonomous vehicle processes the high-G/low-G signals to actuate airbags and/or to provide collision information to a remote system.

20 Claims, 6 Drawing Sheets

(51) Int. Cl.
    *B60W 30/08*         (2012.01)
    *B60W 60/00*         (2020.01)

(56)               References Cited

U.S. PATENT DOCUMENTS

| | | |
|---|---|---|
| 2015/0028207 A1 | 1/2015 | Herrmann et al. |
| 2018/0102001 A1* | 4/2018 | Faust .................. G07C 5/0816 |
| 2020/0160994 A1* | 5/2020 | Iwaasa .................. G16H 50/30 |
| 2020/0241035 A1* | 7/2020 | Classen ................ G01P 15/125 |
| 2021/0380059 A1* | 12/2021 | Jones ................... B60W 50/14 |
| 2023/0138112 A1* | 5/2023 | Gross .................. G05D 1/2247 |
| | | 701/24 |

FOREIGN PATENT DOCUMENTS

| | | |
|---|---|---|
| CN | 104282100 A | 1/2015 |
| CN | 105277741 A | 1/2016 |
| DE | 10250321 A1 | 6/2003 |
| DE | 102019200839 A1 | 7/2020 |
| EP | 2616822 B1 | 7/2015 |
| JP | 2005170370 A | 6/2005 |
| JP | 2006266732 A | 10/2006 |
| WO | 2020089410 A1 | 5/2020 |

* cited by examiner

Slot 1: high G
Slot 2: low G x
Slot 3: low G y

300

310 Receive high-G signals and low-G signals

320 Process the high-G signals and low-G signals

330 Output a high-G signal during a first time slot

340 Output a low-$G_N$ signal during a second time slot

350 Output a low-$G_{N+1}$ signal during a third time slot

COMBINED ACCELERATION SENSOR FOR HIGH-G AND LOW-G CRASH DETECTION FOR AN AUTONOMOUS VEHICLE

CROSS-REFERENCE TO RELATED APPLICATIONS

This application claims priority to provisional application U.S. 63/151,372 filed Feb. 19, 2021, the disclosure of which is hereby incorporated by reference in its entirety.

BACKGROUND

This arrangement relates to an acceleration sensor for high and low crash detection for an autonomous vehicle.

Typically a vehicle includes a plurality of acceleration sensors. Each acceleration sensor is typically paired with an application specific integrated circuit (ASIC) for providing acceleration signals to an electronic controller.

SUMMARY

The combined acceleration sensor provides high and low crash detection while reducing the number of sensing elements and the number of ASICs needed for acceleration sensing. By reducing the number of sensing elements and ASICs, the acceleration sensor is more compact, and utilizes less space in a vehicle. Further, requiring fewer sensing elements and ASICs, while providing the same performance, is also less expensive.

One embodiment is an acceleration sensor for a vehicle comprising: a micro-electro-mechanical system (MEMS) high-G sensing element configured to detect a vehicle collision for triggering an air bag; a micro-electro-mechanical system (MEMS) low-G sensing element configured to detect a lesser vehicle collision for providing an indication of a lesser vehicle collision; and an application specific integrated circuit (ASIC) in communication with the MEMS high-G sensing element and the MEMS low-G sensing element. The ASIC is provided in a same acceleration sensor housing as the MEMS high-G sensing element and the MEMS low-G sensing element. The ASIC is configured to: receive a high-G signal from the MEMS high-G sensing element, receive a low-G signal from the MEMS low-G sensing element, process the high-G signal and the low-G signal, output a high-G signal during a first time slot, output a low-$G_N$ signal during a second time slot, and output a low-$G_{N+1}$ signal during a third time slot, wherein $G_N$ represents one of X, Y, and Z directions and $G_{N+1}$ represents another of the X, Y, and Z directions.

In another embodiment, an acceleration sensor for a vehicle comprises: an acceleration sensor housing including a base, and having a plurality of contacts; a single MEMS housing disposed in the acceleration sensor housing and including a micro-electro-mechanical system (MEMS) high-G sensing element configured to detect a vehicle collision for triggering an air bag, and a micro-electro-mechanical system (MEMS) low-G sensing element configured to detect a lesser vehicle collision for providing an indication of a lesser vehicle collision; and an application specific integrated circuit (ASIC) disposed in the acceleration sensor housing, the ASIC being in communication with the MEMS high-G sensing element and the MEMS low-G sensing element for receiving signals therefrom.

Another embodiment is directed to a collision determination system for an autonomous vehicle. The collision determination system includes a plurality of acceleration sensors. Each acceleration sensor includes a micro-electro-mechanical system (MEMS) high-G sensing element configured to detect a vehicle collision for triggering an air bag; a micro-electro-mechanical system (MEMS) low-G sensing element configured to detect a lesser vehicle collision for providing an indication of a lesser vehicle collision; and an application specific integrated circuit (ASIC) in communication with the MEMS high-G sensing element and the MEMS low-G sensing element. The ASIC is configured to: receive a high-G signal from the MEMS high-G sensing element, receive a low-G signal from the MEMS low-G sensing element, process the high-G signal and the low-G signal, and output a high-G sensor signal, output a low-$G_N$ signal, and output a low-$G_{N+1}$ signal. The collision determination system also includes a transceiver for transmitting wireless signals to a remote system; and an electronic controller in communication with the transceiver. The electronic controller is configured to: receive the high-G signal, the low-$G_N$ signal, and the low-$G_{N+1}$ signal from each of the ASICs, determine when the high-G signal is below an airbag deployment threshold, and the low-G signal is above a lesser collision threshold, and then transmit collision information via the transceiver to a remote system to determine severity and cause of a low-G signal indicating a collision.

Other aspects, features, and embodiments will become apparent by consideration of the detailed description and accompanying drawings.

BRIEF DESCRIPTION OF THE DRAWINGS

FIG. 1 illustrates a block diagram of one embodiment of a peripheral acceleration sensor for a vehicle.

FIG. 1A shows one embodiment of a peripheral acceleration sensor that includes a separate MEMS high-G housing and MEMS low-G housing.

FIG. 1B shows another peripheral acceleration sensor of separate MEMS high-G housing and MEMS low-G housing, and an ASIC.

DETAILED DESCRIPTION

Figure 2:
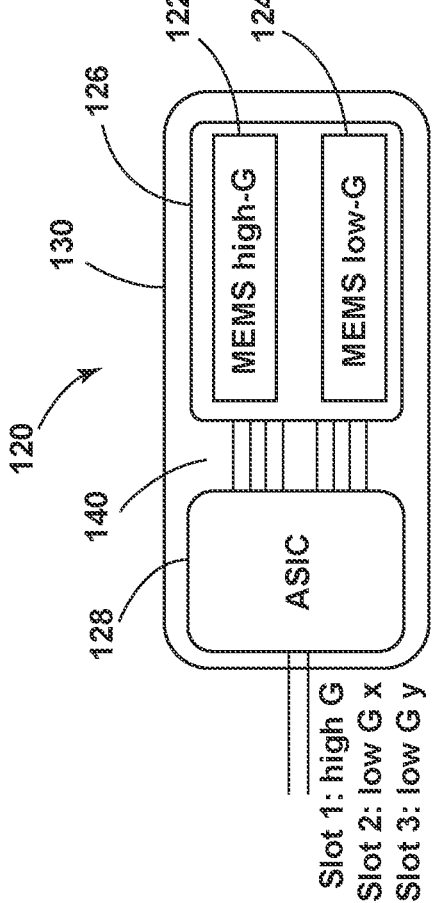
FIG. 2 illustrates a block diagram of another embodiment of a peripheral acceleration sensor for a vehicle having a single MEMS housing.

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable media) executable by one or more electronic controllers. For example, "units," "control units," and "controllers" described in the specification can include one or more electronic controllers, one or more memories including non-transitory computer-readable media, one or more input/output interfaces, one or more application specific integrated circuits (ASICs) and other circuits, and various connections or connectors (for example, wires, printed traces, and buses) connecting the various components. In some embodiments, an ASIC is a programmable ASIC that includes a memory storage medium. In some embodiments, an ASIC executes one or more software or firmware programs.

Figures 1, 1A, 1B:
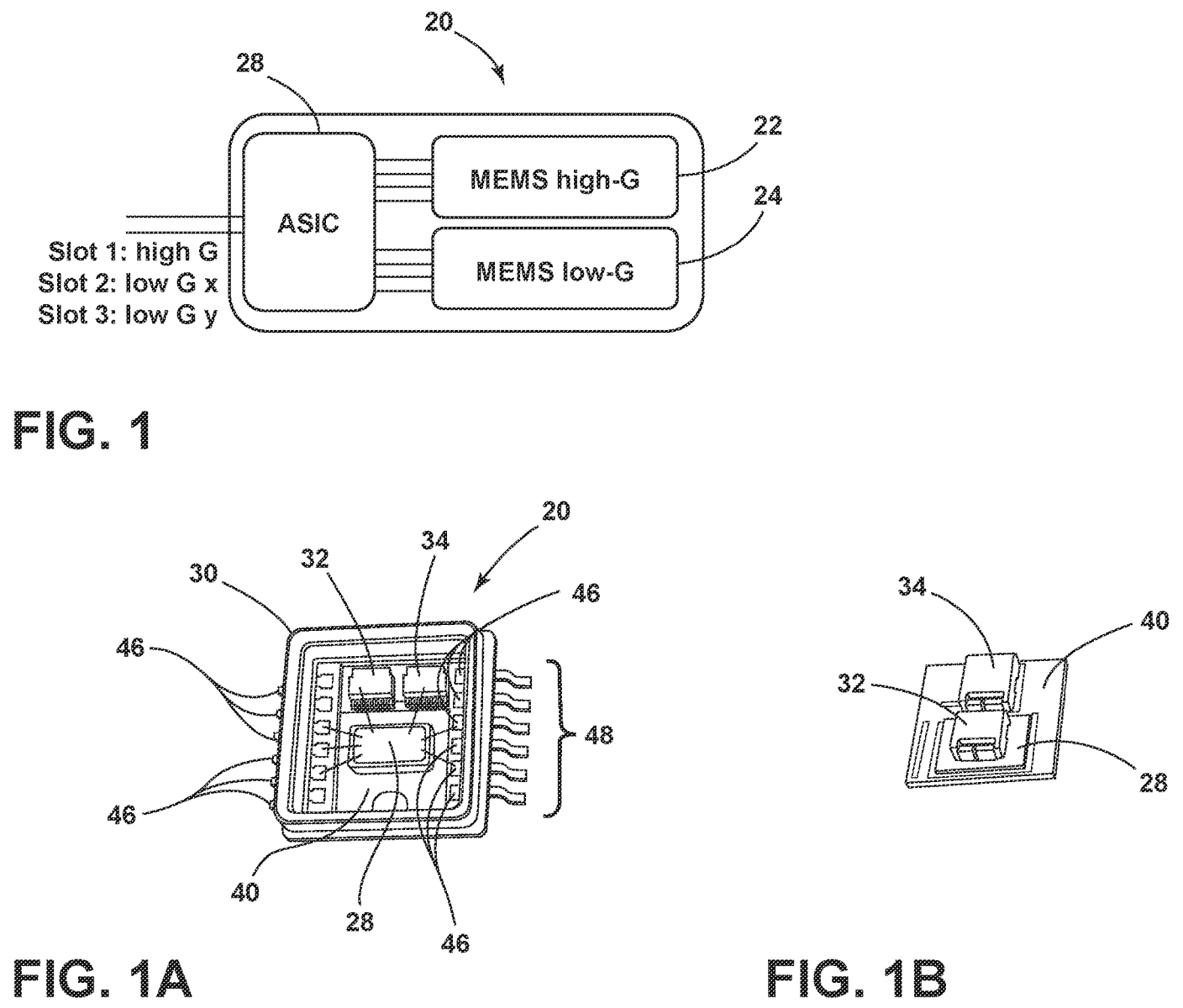

FIG. 1 shows a block diagram view of a peripheral acceleration sensor 20 for a vehicle. The peripheral acceleration sensor 20 includes a micro-electro-mechanical system ("MEMS") high-G sensing element 22, a MEMS low-G sensing element 24, and an application specific integrated circuit ("ASIC") 28 electrically connected to the sensing elements 22, 24 to receive high-G signals and low-G signals.

FIG. 1A shows a first embodiment of the peripheral acceleration sensor 20 that includes an acceleration sensor housing 30 that receives the MEMS high-G sensing element 22 disposed in a first MEMS high-G housing 32 and the MEMS low-G sensing element 24 disposed in a second MEMS low-G housing 34. The peripheral acceleration sensor 20 includes an acceleration sensor housing base 40 receiving or supporting the housings 32, 34, and the ASIC 28. The peripheral acceleration sensor 20 includes contact pads 46 and a corresponding plurality of contacts 48. Electrical connections are provided between the MEMS high-G sensing element 22, the MEMS low-G sensing element 24, and the ASIC 28. Further, electrical connections are provided between the ASIC 28 and the contact pads 46.

FIG. 1B shows another arrangement of elements on an acceleration sensor housing base 40. In this embodiment, the MEMS high-G housing 32 is disposed on the ASIC 28 and the MEMS low-G housing 34 is disposed adjacent thereto. The various elements shown in FIG. 1B are electrically connected in a similar manner as in FIG. 1A.

FIG. 2 shows another embodiment of a peripheral acceleration sensor 120. In this embodiment, The MEMS high-G sensing element 122 and the MEMS low-G sensing element 124 are disposed in a single MEMS housing 126. The peripheral acceleration sensor 120 includes an ASIC 128 electrically connected to the sensing elements 122, 124 in the single MEMS housing 126 to receive high-G signals and low-G signals.

The peripheral acceleration sensor 120 includes an acceleration sensor housing 130 including an acceleration sensor housing base 140 for receiving the MEMS housing 126, and the ASIC 128 thereon. The peripheral acceleration sensor 120 includes contact pads and a corresponding plurality of contacts as in the FIG. 1-1B embodiment. Electrical connections are provided between the ASIC 128 and both of the MEMS high-G sensing element 122 and the MEMS low-G sensing element 124. Further, electrical connections are provided between the ASIC 128 and the contact pads as in the FIG. 1-1B embodiment.

Figure 2A:
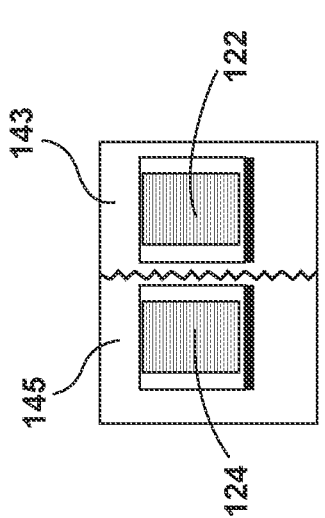
FIG. 2A shows a MEMS high-G sensing element and a MEMS low-G sensing element provided in the acceleration sensor housing.

FIG. 2A shows the MEMS high-G sensing element 122 provided in a first silicon substrate 143. FIG. 2A shows the MEMS low-G sensing element 124 provided in a second silicon substrate 145. In one embodiment, the sensing elements 122, 124 are tiny, comb-shaped fingers made of silicon. In some embodiments, the comb-shaped fingers interlock with each other.

Figure 3:
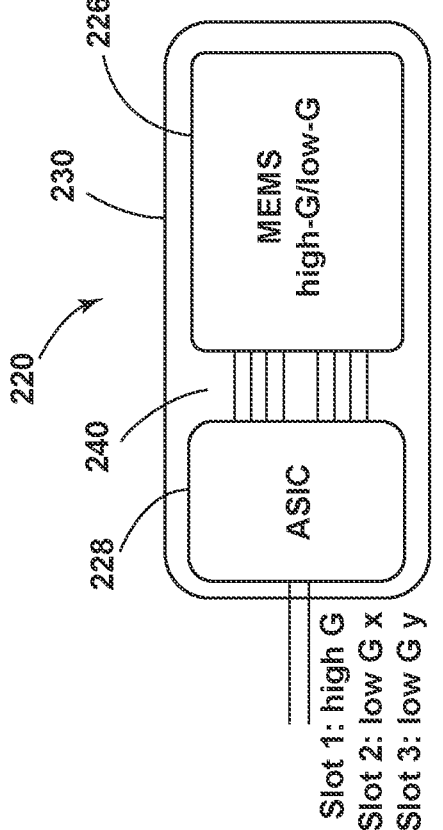
FIG. 3 illustrates a block diagram of another embodiment of a peripheral acceleration sensor for a vehicle having a combined single low/high-G sensing element.
Figure 3:

FIG. 3 shows another embodiment of a peripheral acceleration sensor 220. In this embodiment, the MEMS high-G sensing element and the MEMS low-G sensing element are a single MEMS low-G/high-G sensing element 223 disposed in a single MEMS housing 226. The peripheral acceleration sensor 220 includes an ASIC 228 electrically connected to the MEMS low-G/high-G sensing element 223 in the single MEMS housing 226 to receive high-G signals and low-G signals.

The peripheral acceleration sensor 220 includes an acceleration sensor housing 230 including an acceleration sensor housing base 240 for receiving the MEMS housing 226, and the ASIC 228 thereon. The peripheral acceleration sensor 220 includes contact pads and a corresponding plurality of contacts as in the FIG. 1-1B embodiment. Electrical connections are provided between the ASIC 228 and the MEMS low-G/high-G sensing element 223. Further, electrical connections are provided between the ASIC 228 and the contact pads as in the FIG. 1-1B embodiment.

Figure 3A:
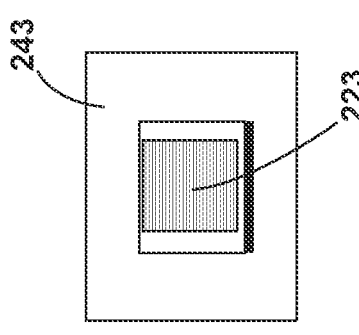
FIG. 3A shows a combined single integrated low/high-G sensing element provided on same substrate.

FIG. 3A shows the MEMS low-G/high-G sensing element 223 provided or etched in a silicon substrate 243. In one embodiment, the low-G/high-G sensing element 223 are tiny, multiple comb-shaped fingers made of silicon. In some embodiments, the comb-shaped fingers interlock with each other.

Operation

Figure 4:
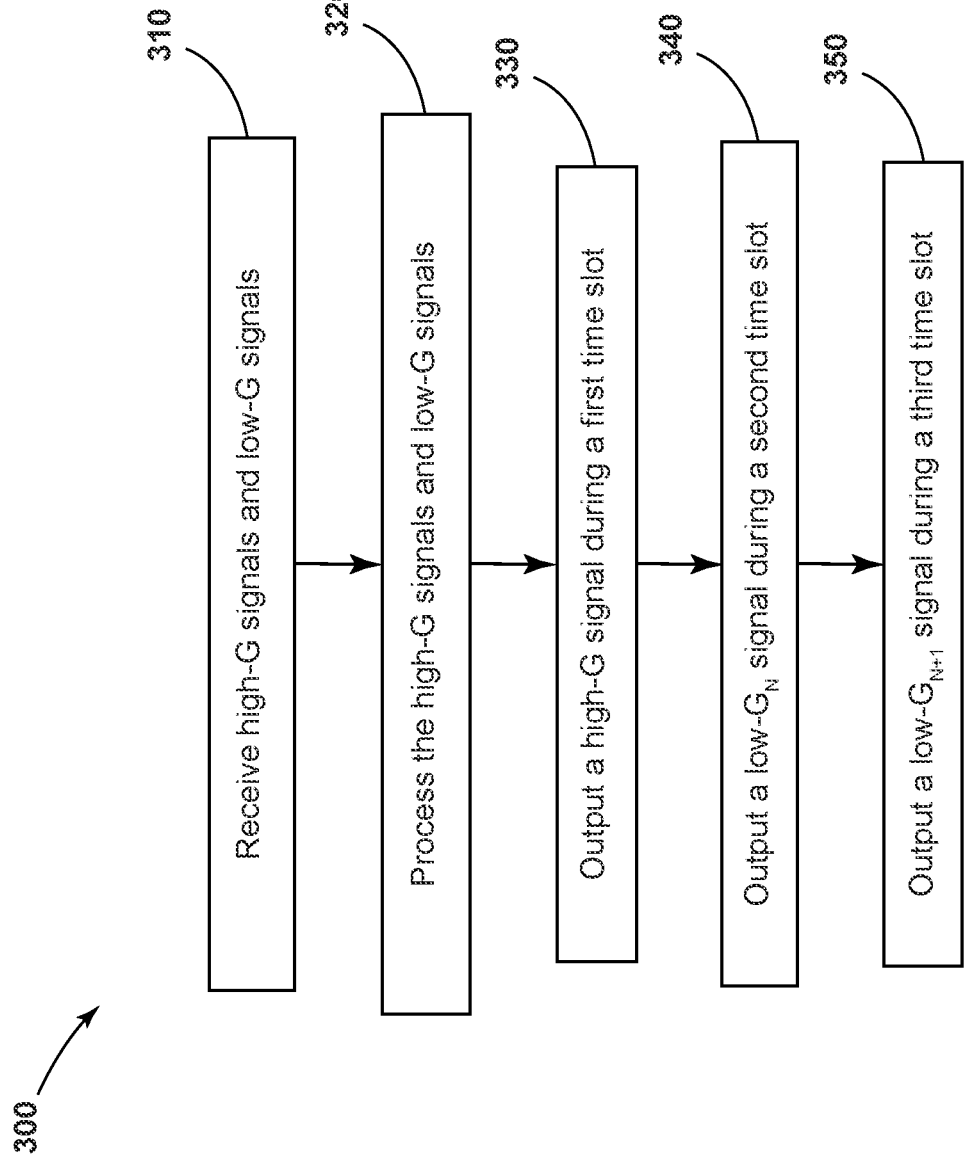
FIG. 4 illustrates a flow chart of operation of an acceleration sensor arrangement.

FIG. 4 shows a flow chart 300 of the operation of the peripheral acceleration sensors 20, 120, 220. In a first step 310, the ASIC 28, 128, 228 is configured to receive high-G signals and low-G signals from the high-G/low-G sensing element(s) as in shown in each of the embodiments of FIGS. 1-3.

In a second step 320, the ASIC 28, 128, 228 is configured to process the high-G signals and the low-G signals. In processing the signals, peripheral acceleration signal values are stored in a memory at least temporarily.

In a next step 330, during a first time slot the ASIC 28, 128, 228 outputs a high-G signal. In a subsequent step 340, the ASIC 28, 128, 228 outputs a low-$G_N$ sensor signal during a second time slot. In a final step 350, the ASIC 28, 128, 228 outputs a low-$G_{N+1}$ sensor signal during a third time slot.

In one embodiment, the G signals are 10-bit signals.

In one embodiment, the MEMS low-G sensing elements 24, 124, 224 senses acceleration in a range from about 0.02 g to about 2 g, and the MEMS high-G sensing elements 22, 122, 222 senses acceleration from impacts in a range from about 2 g to about 120 g. The value "g" represents a g-force of 1 g that is equal to a conventional value of gravitational acceleration on earth of about 9.8 m/s$^2$.

Collision Determination System

Figure 5:
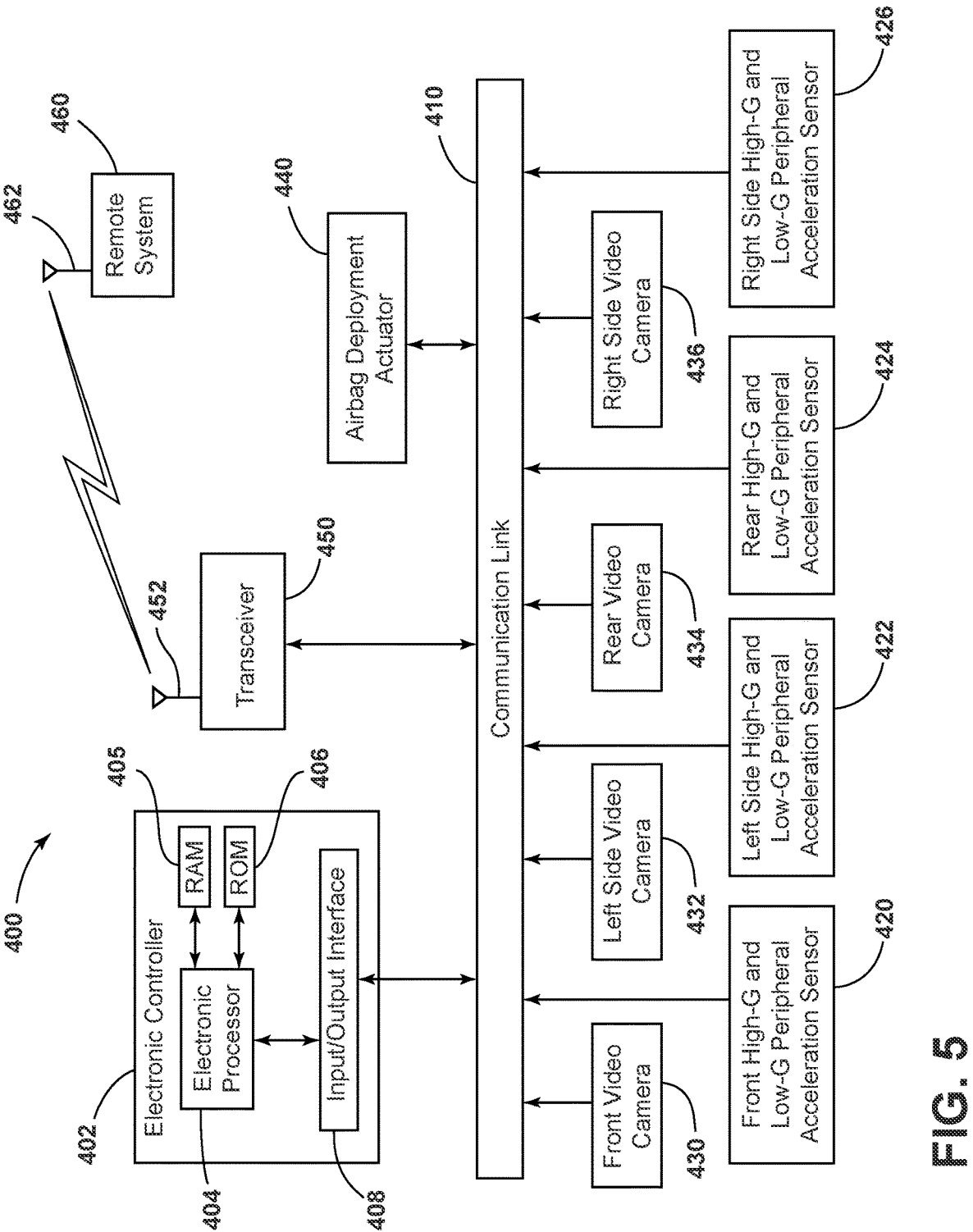
FIG. 5 illustrates a block diagram of one embodiment of a collision determination system.

FIG. 5 shows a collision determination system 400 for a vehicle. An electronic controller 402 analyzes information from peripheral acceleration sensors and controls an airbag deployment actuator or provides information to a remote system. The electronic controller 402 includes an electronic processor 404 and one or more non-transitory, computer-readable memory modules. In the example of FIG. 5, the electronic controller 402 includes a random access memory ("RAM") 405 and a read-only memory ("ROM") 406. The electronic controller 402 also includes an input/output interface 408 that transmits and receives data over a communication link 410. In one embodiment, the communication link 410 is a Flex-ray bus or a controller area network ("CAN") bus. In another embodiment, a wireless communication link is provided.

It should be understood that the electronic controller 402 can include multiple processors, additional computer-readable memory modules, multiple input/output interfaces, and/or additional components or modules (e.g., hardware, software, or a combination thereof).

The electronic processor 404 receives information from the input/output interface 408 and processes the information by executing instructions for one or more software modules (which may also be referred to as a "controller" or "controllers") stored to a memory, such as the ROM 406. The electronic processor 404 stores information to and retrieves information from the RAM 405 (e.g., information received from other vehicle subsystems or sensors through the communication link 410 and information generated by modules executed by the electronic processor 404). The non-transitory computer readable memory modules of the electronic controller 402 include volatile memory, non-volatile memory, or a combination thereof and, in various constructions, may also store operating system software, applications/instructions data, and combinations thereof.

Various other vehicle subsystems are also connected to the communication link 410 and communicate with the electronic controller 402, various vehicle sensors, and the other vehicle subsystems. For example, FIG. 5 shows a front high G and Low G peripheral acceleration sensor 420, a left side high G and Low G acceleration sensor 422, a rear high G and Low G acceleration sensor 424, and a right side high G and Low G acceleration sensor 426. Each of the high G and Low G sensors is connected to the communication link 410 and capable of providing high-G and low-G signals to other devices connected to the communication link. While four acceleration sensors 420, 422, 424, 426 are illustrated, any number for plurality of acceleration sensors are contemplated. In one embodiment, at least four of the sensors 420, 422, 424, 426 are oriented at four different locations about the autonomous vehicle.

FIG. 5 also shows a front video camera 430, a left side video camera 432, a rear video camera 434, and a right side video camera 436. The video cameras have a field of view that are oriented outwardly from the vehicle to detect objects that may contact the vehicle. In some embodiments, panoramic video cameras are utilized. A memory at least temporarily stores images obtained by the video cameras 430, 432, 434, 436. While four video cameras 430, 432, 434, 436 are illustrated, any number including a plurality of video cameras is contemplated. In another embodiment, additional video cameras are oriented and secured to the autonomous vehicle and mounted, for example, on a bumper or onto rear view mirrors for obtaining video information about a body of the autonomous vehicle at or near an area of the collision impact.

FIG. 5 also shows an airbag deployment actuator 440 connected to the communication link 410. The airbag deployment actuator 440 actuates select vehicle airbags depending upon sensed high-G signals in a determination by the electronic controller 402.

FIG. 5 shows a transceiver 450 having an antenna 452 for wirelessly transmitting information. The transceiver 450 transmits information provided by the electronic controller 402 or other components.

FIG. 5 also shows a remote system 460 having an antenna 462 for receiving low-G signals and video signals from the electronic controller 402. In one embodiment, the remote system 460 includes an electronic processor, memory and other elements similar to the electronic controller 402. The remote system 460 includes other video image analysis applications. In one embodiment, a server is a component of the remote system 460. In response to video image analysis, the remote system 460 provides return signals to the transceiver to, for example, permit continued driving of an autonomous vehicle, to disable the autonomous vehicle, or to release passengers and return the autonomous vehicle to a repair location or other destination.

Operation

Figure 6:
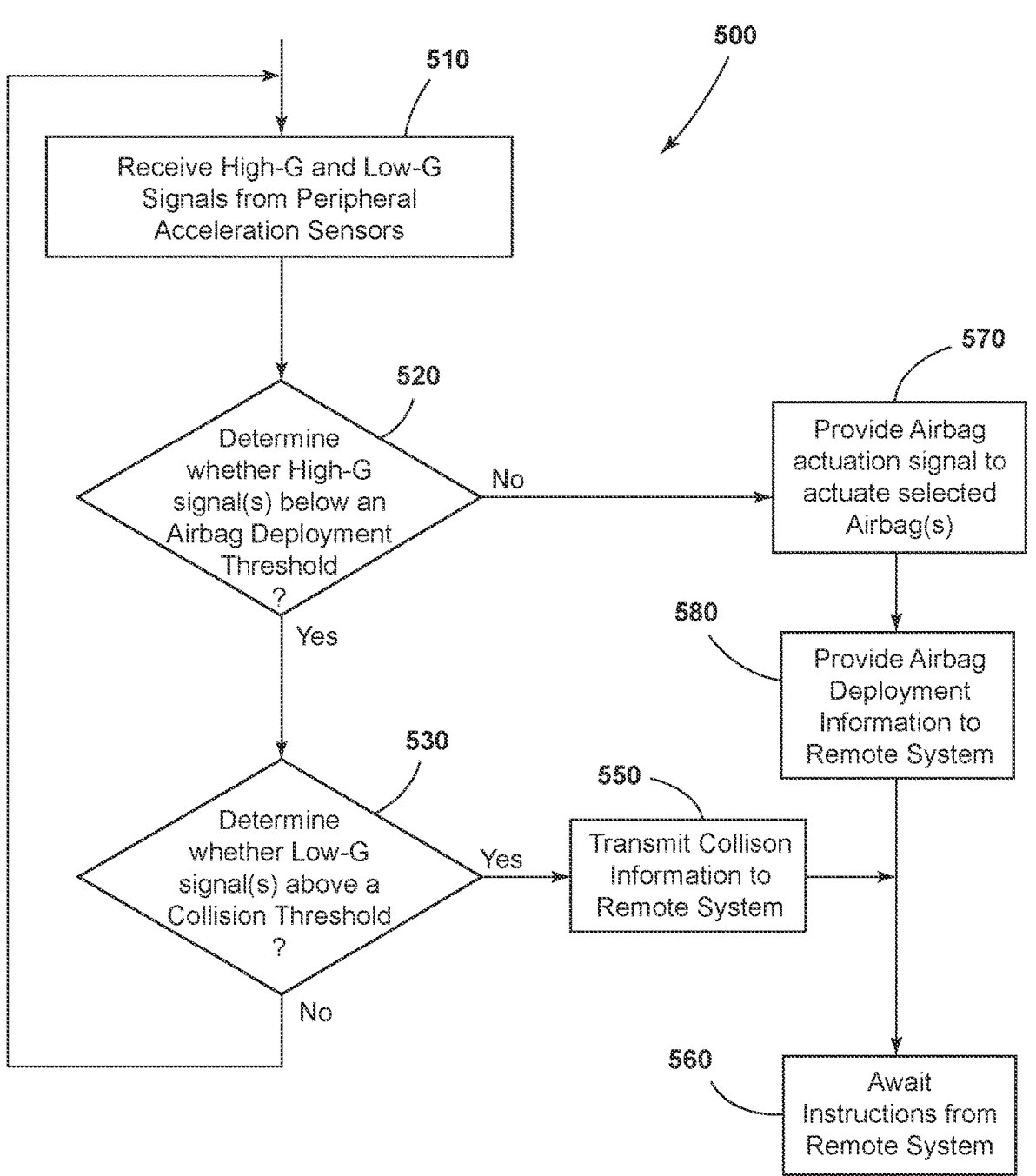
FIG. 6 illustrates a flow chart of operation of a collision determination system.

FIG. 6 shows a flow chart 500 of the operation of the collision determination system 400 shown in FIG. 5. In a first step 510, the electronic controller 402 receives high-G and low-G signals from various peripheral acceleration sensors 20, 120, 220.

At decision step 520, the electronic processor 404 determines whether high-G signals or features from multiple peripheral acceleration sensors 20, 120, 220 are below an airbag deployment threshold. In one embodiment the electronic processor 404 computes peaks or averages for raw signals from the peripheral acceleration sensors. If yes, the computed signal is below the threshold, the electronic processor 404 advances to decision step 530.

At decision step 530, the electronic processor 404 determines whether low-G signals or features from multiple peripheral acceleration sensors 20, 120, 220 are above a collision threshold. In one embodiment the electronic processor 404 computes peaks or averages for raw low-G signals from the peripheral acceleration sensors. When the computed low-G signals are not above the threshold, the electronic processor 404 advances to step 510 and repeats the collision determination process.

At decision step 530, when the low-G signal has a value above a collision threshold, the electronic processor 404 advances to step 540. In one embodiment, the collision threshold is a value of 0.2 g. In another embodiment, the collision threshold is a value of 0.7 g. Other collision thresholds are contemplated.

At step 540, the electronic processor 404 transmits collision information to the remote system 460 via the transceiver 450. In one embodiment, the collision information includes one or more of values for the low-G signals, and video signals from before, during, and after the collision. The electronic processor 404 advances to step 560.

At step 560, the electronic controller 402 awaits instructions from the remote system 460. Typically, the autonomous vehicle will remain motionless until movement is authorized by the remote system 460 or authorization by a user at an accident scene with authorized access to communicate with the electronic controller 402.

Returning to decision step 520, when the electronic processor 404 determines that the high-G signal(s) is not below an airbag deployment threshold, the electronic processor 404 advances to step 570. At step 570, the electronic processor 404 provides an airbag deployment signal on communication link 410 to the airbag deployment actuator 440. The airbag deployment actuator 440 receives the actuator signal and actuates one or more selected airbags depending on which of the high-G signals is greater than the airbag deployment threshold. The electronic processor 404 then advances to step 580. In one embodiment, the airbag deployment threshold is a value of 20 g. In another embodiment, the airbag deployment threshold is a value of 30 g. Different airbag deployment thresholds can be provided for different airbags and for different high-G acceleration sensors depending upon their location on an autonomous vehicle.

At step 580, the electronic processor 404 provides airbag deployment information via the transceiver 450 to the remote system 460. The airbag deployment information includes which airbags were deployed. Further, video signals from before, during, and after the airbag deployment are provided from select video cameras 430, 432, 434, 436 corresponding to peripheral acceleration sensors 420, 422, 424, 426 that exceeded the airbag deployment threshold.

Thereafter, the electronic processor advances to step 560 and awaits instructions from the remote system 460 or from a user at an accident scene with authorized access to communicate with the electronic controller 402.

Various features, advantages, and embodiments are set forth in the following claims.

What is claimed is:
1. A collision determination system for a vehicle comprising:
    an acceleration sensor including:
        a micro-electro-mechanical system (MEMS) high-G sensing element configured to detect a vehicle collision for triggering an air bag;
        a micro-electro-mechanical system (MEMS) low-G sensing element configured to detect a vehicle collision for providing an indication of a vehicle collision; and
        an application specific integrated circuit (ASIC) in communication with the MEMS high-G sensing element and the MEMS low-G sensing element, wherein the ASIC is provided in a same acceleration sensor housing as the MEMS high-G sensing element and the MEMS low-G sensing element, and wherein the ASIC is configured to:
        receive a high-G signal from the MEMS high-G sensing element,
        receive a low-G signal from the MEMS low-G sensing element,
        process the high-G signal and the low-G signal,
        output a high-G signal during a first time slot,
        output a low-$G_N$ signal during a second time slot, and
        output a low-$G_{N+1}$ signal during a third time slot,
        wherein $G_N$ represents one of X, Y, and Z directions and $G_{N+1}$ represents another of the X, Y, and Z directions,
    a transceiver for transmitting wireless signals;
    an electronic controller that receives the low-G signal output by the low-G sensing element, the electronic controller providing the low-G signal output to the transceiver; and
    a remote system configured to receive the low-G signal output from the transceiver, the remote system determining severity and cause of the low-G signal indicating the vehicle collision.
2. The collision determination system according to claim 1, wherein the MEMS low-G sensing element and the

MEMS high-G sensing element are provided in a single MEMS housing disposed in the acceleration sensor housing.
3. The collision determination system according to claim 1, wherein the MEMS high-G sensing element and the MEMS low-G sensing element are integrated as a single MEMS low-G/high-G sensing element.
4. The collision determination system according to claim 1, wherein the MEMS high-G sensing element and the MEMS low-G sensing element are provided in separate MEMS housings disposed in the same acceleration sensor housing.
5. The collision determination system according to claim 1, wherein the MEMS low-G sensing element senses acceleration in a range from 0.02 g to 2 g, and wherein the MEMS high-G sensing element senses acceleration from impacts in a range from 2 g to 120 g, wherein g represents a g-force of 1 g that is equal to a conventional value of gravitational acceleration on earth of about 9.8 m/s$^2$.
6. The collision determination system according to claim 1, wherein the high-G sensing element outputs the high-G signal that is received by the electronic controller in the vehicle, wherein the vehicle is an autonomous vehicle.
7. The collision determination system according to claim 1, wherein collision information transmitted to the remote system includes video information from vehicle mounted video cameras disposed near an area of the collision.
8. The collision determination system according to claim 1, wherein the ASIC is a programmable ASIC that includes a memory storage medium.
9. A collision determination system for a vehicle comprising:
    an acceleration sensor including:
        an acceleration sensor housing including a base, and having a plurality of contacts;
        a single MEMS housing disposed in the acceleration sensor housing and including a micro-electro-mechanical system (MEMS) high-G sensing element configured to detect a vehicle collision for triggering an air bag, and a micro-electro-mechanical system (MEMS) low-G sensing element configured to detect a vehicle collision for providing an indication of a vehicle collision; and
        an application specific integrated circuit (ASIC) disposed in the acceleration sensor housing, the ASIC being in communication with the MEMS high-G sensing element and the MEMS low-G sensing element for receiving signals therefrom;
    a transceiver for transmitting wireless signals;
    an electronic controller in communication with the transceiver, the electronic controller configured to:
        receive the high-G signal output by the high-G sensing element and provide an airbag deployment signal to an airbag deployment actuator when the high-G signal is greater than an airbag deployment threshold; and
        receive the low-G signal output by the low-G sensing element and determine when the low-G signal is above a collision threshold, and then provide the low-G signal to the transceiver; and
    a remote system for receiving the low-G signal from the transceiver, the remote system configured to determine severity and cause of the low-G signal.
10. The collision determination system according to claim 9, wherein the ASIC is configured to:
    output a high-G signal during a first time slot,
    output a low-$G_N$ sensor signal during a second time slot, and output a low-$G_{N+1}$ sensor signal during a third time slot, wherein $G_N$ represents one of X, Y, and Z directions and $G_{N+1}$ represents another of the X, Y, and Z directions.

11. The collision determination system according to claim 9, wherein the ASIC is a programmable ASIC that includes a memory storage medium.

12. The collision determination system according to claim 10, wherein the MEMS high-G sensing element and the MEMS low-G sensing element are integrated as a single MEMS low-G/high-G sensing element.

13. The collision determination system according to claim 10, wherein the MEMS low-G sensing element senses acceleration in a range from 0.02 g to 2 g, and wherein the MEMS high-G sensing element senses acceleration from impacts in a range from 2 g to 120 g.

14. The collision determination system according to claim 9, wherein the vehicle is an autonomous vehicle, and wherein the remote system that determines the severity and the cause of the low-G signal provides return signals to the electronic controller via the transceiver to permit continued driving of the autonomous vehicle, or to release passengers while disabling the autonomous vehicle.

15. A collision determination system for an autonomous vehicle including:

a plurality of acceleration sensors, wherein each acceleration sensor includes a micro-electro-mechanical system (MEMS) high-G sensing element configured to detect a vehicle collision for triggering an air bag;

a micro-electro-mechanical system (MEMS) low-G sensing element configured to detect a vehicle collision for providing an indication of a vehicle collision; and an application specific integrated circuit (ASIC) in communication with the MEMS high-G sensing element and the MEMS low-G sensing element, wherein the ASIC is configured to:

receive a high-G signal from the MEMS high-G sensing element, receive a low-G signal from the MEMS low-G sensing element, process the high-G signal and the low-G signal, and output a high-G signal, output a low-$G_N$ sensor signal, and output a low-$G_{N+1}$ sensor signal, a transceiver for transmitting wireless signals;

an electronic controller in communication with the transceiver, the electronic controller configured to:

receive the high-G signal, the low-$G_N$ signal, and the low-$G_{N+1}$ signal from each of the ASICs; and determine when the high-G signal is below an airbag deployment threshold, and the low-G signal is above a collision threshold, and then provide the low-G signal to the transceiver; and a remote system configured to receive the low-G signal from the transceiver, and to determine severity and cause of the low-G signal indicating a collision.

16. The collision determination system according to claim 15, wherein the collision information includes video information from one of a plurality of video cameras for an area of a collision impact, and the electronic controller transmits the video information to the remote system via the transceiver to determine the severity and the cause of the low-G signal indicating the collision.

17. The collision determination system according to claim 15, wherein the plurality of acceleration sensors include at least four of the acceleration sensors oriented at four different locations about the autonomous vehicle.

18. The collision determination system according to claim 16, wherein the MEMS high-G sensing element and the MEMS low-G sensing element are integrated as a single MEMS low-G/high-G sensing element.

19. The collision determination system according to claim 15, wherein the electronic controller is configured to determine when the high-G signal has a value above the airbag deployment threshold and provide an airbag deployment signal to an airbag deployment actuator.

20. The collision determination system according to claim 16, wherein the remote system that determines the severity and the cause of the low-G signal provides return signals to the electronic controller via the transceiver to permit continued driving of the autonomous vehicle, or to release passengers while disabling the autonomous vehicle.

* * * * *